United States Patent [19]

Scrantom et al.

[11] 4,445,851
[45] May 1, 1984

[54] APPARATUS AND METHOD FOR FIRING CERAMIC ARTICLES OR THE LIKE

[75] Inventors: Dehart G. Scrantom, Shallotte, N.C.; Truman C. Rutt, Myrtle Beach, S.C.

[73] Assignee: AVX Corporation, Great Neck, N.Y.

[21] Appl. No.: 262,033

[22] Filed: May 8, 1981

[51] Int. Cl.³ .......................... F27D 3/00; F27B 15/00
[52] U.S. Cl. ................................. 432/239; 373/79; 414/211; 432/197
[58] Field of Search .................. 432/98, 197, 239; 414/211; 373/79, 81, 111

[56] References Cited

U.S. PATENT DOCUMENTS

| | | | |
|---|---|---|---|
| 539,769 | 5/1895 | Garvin | 432/101 |
| 1,712,132 | 5/1929 | Breyer et al. | 432/239 |
| 2,933,796 | 4/1960 | Somogyi | 264/57 |
| 2,968,551 | 1/1961 | North et al. | 419/56 |
| 3,415,505 | 12/1968 | Cook | 432/11 |
| 3,585,023 | 6/1971 | Vlnaty et al. | 432/197 |

FOREIGN PATENT DOCUMENTS

| | | |
|---|---|---|
| 1332225 | 10/1973 | United Kingdom . |
| 1383152 | 2/1975 | United Kingdom . |
| 1415057 | 11/1975 | United Kingdom . |
| 1569153 | 6/1980 | United Kingdom . |

*Primary Examiner*—John J. Camby
*Attorney, Agent, or Firm*—Arthur B. Colvin

[57] ABSTRACT

The present invention relates to an apparatus and method for the continuous firing of green ceramic articles, such as capacitors. In accordance with the invention a mixture of articles to be fired and heat resistant particulate matter in selected proportions is caused to descend a heated tube defining a furnace. Articles and particulate material such as sand are continuously introduced at the upper end of the furnace and removed at the lower end, after a predetermined dwell time within the furnace to effect firing. Removal is effected by progressively advancing a conveyor which is in partial blocking condition of the lower end of the furnace across the lower end of said furnace whereby the mixture of sand and fired ceramic articles is removed at a selected rate which is a function of the speed of the conveyor, whereby the dwell time in the furnace is closely controlled.

8 Claims, 2 Drawing Figures

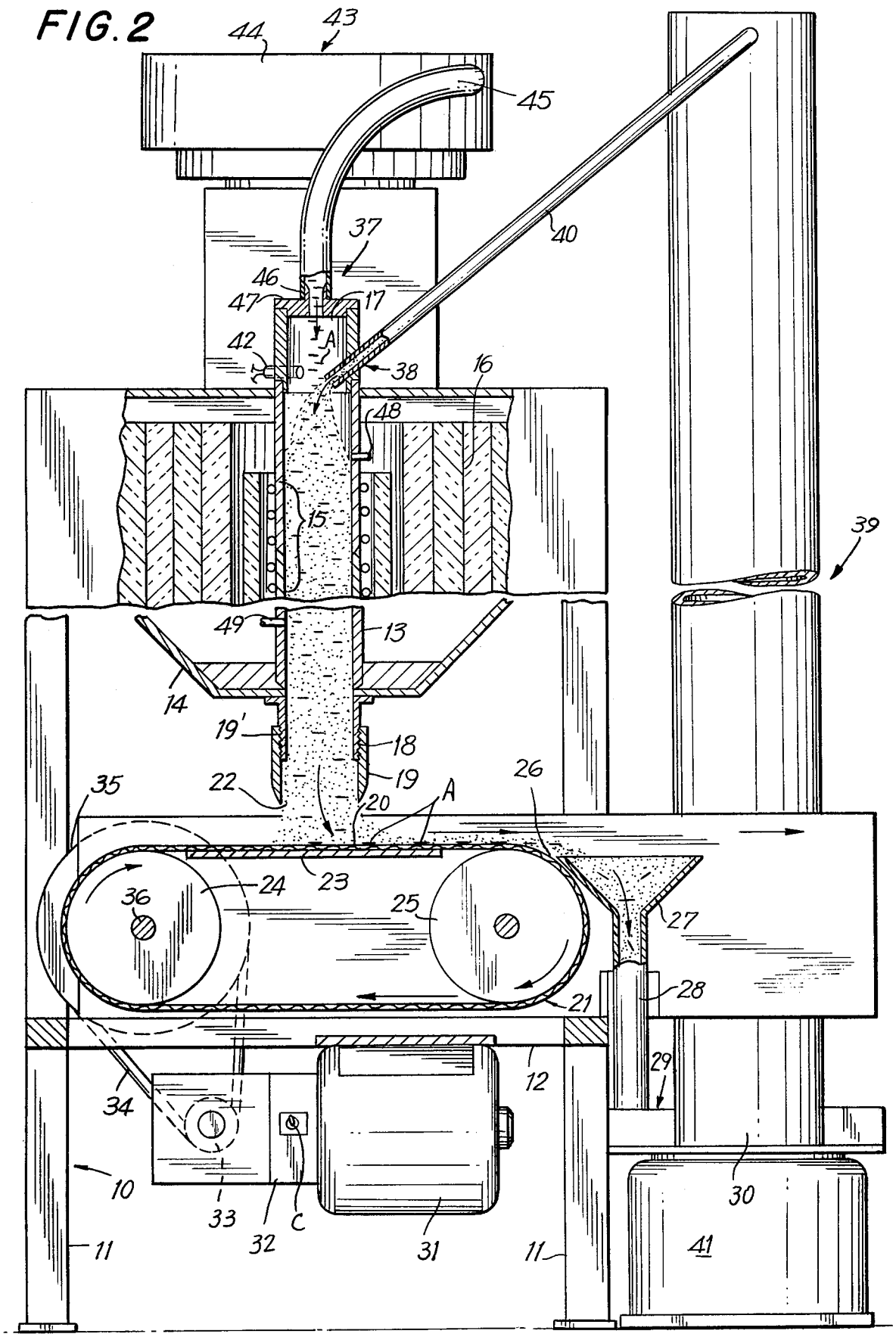

APPARATUS AND METHOD FOR FIRING CERAMIC ARTICLES OR THE LIKE

BACKGROUND OF THE INVENTION

1. Field of the Invention

The present invention is directed to an improved apparatus and method for firing green ceramic articles, such as chip capacitors, which include a ceramic dielectric such as barium titanate.

2. The Prior Art

As conducive to an understanding of the present invention, it may be stated that the current methods for manufacturing monolithic ceramic capacitors typically involve forming ceramic sub-strates from fine particles of the desired dielectric composition in a binder of organic polymeric material. The sub-strates may be imprinted, as by silk screening with an ink incorporating a binder and finely divided particles of metal resistant to oxidation at sintering temperatures to form an electrode area. A plurality of electrode bearing sub-strates of green ceramic are superimposed in a carefully oriented manner, such that the electrodes in successive layers are arrayed in partial registering position and are then compressed.

Typically, the main body portion of electrodes in adjacent layers will overlap throughout their major extent, with the margins of electrodes in alternate layers being offset.

Thereafter, the superimposed sub-strates are subdivided into small increments along cutting lines such as to expose edge portions of the electrodes of alternate layers at opposite sides of the increments.

The increments are heated to firing temperature to drive off the binder and sinter the dielectric to thus convert the green ceramic to a dense monolithic material having a high dielectric constant.

Finally, the fired capacitors thus formed are terminated, i.e. fitted with leads, and, typically, thereafter encapsulated in an insulating jacket.

The operation of prefiring the green ceramic articles to burn off organic materials and subsequent firing, has heretofore been protracted, energy intensive, costly, and has involved a great deal of handling of the fragile and often miniscule prefired articles. More particularly, in accordance with a conventional manufacturing procedure, the articles are carefully loaded onto individual sleds in mutually spaced relation. The sleds, which are mounted on conveyors, are thereafter led through horizontal kilns at a controlled rate.

Often the firing and cooling period will take approximately 17 hours. The kilns typically are expensive and extremely inefficient in the use of energy.

More recently an improved procedure has been developed whereby the green ceramic preforms are loaded on an aluminum tray and heated to drive off the organics, the articles, after burnout, being loaded into boats in bulk, covered with zirconium oxide sand, and then fired. This improvement has greatly increased the firing rate but has, nonetheless, required the use of inefficient kiln furnaces and the like.

SUMMARY OF THE INVENTION

The present invention may be summarized as directed to an apparatus for continuously processing green ceramic articles whereby a constant supply of such articles is progressively introduced and a constant stream of fired ceramic chips progressively removed. More particularly, the invention is directed to a firing apparatus comprising a vertically oriented tube, at least a section of which is heated. The tube is initially filled with sand or like heat resistant particulate matter. The horizontally arrayed exit end of the tube is blocked by a conveyor, such as a perforate belt or disk, the upper surface of which is disposed in proximate spaced relation to the lower end of the tube, the spacing between the conveyor and tube being sufficiently close to prevent the free flow of material, but sufficiently great to permit a ceramic article to be shifted between the conveyor and the tube exit.

After the tube is initially filled with sand for start-up, a supply of green ceramic articles is progressively introduced at the upper end of the tube together with a predetermined proportion of sand, while at the same time the conveyor is caused to shift horizontally progressively to remove increments of sand from the lower or exit end of the tube.

It will thus be seen that a mixture of articles and sand will ultimately descend through the tube, and particularly the heating zone therein, at a selected rate dependent upon the rate at which sand and articles are removed at the lower end.

Optionally, an inert, an oxidizing or a reducing gas may be caused to flow through the tube in a desired direction.

Material is withdrawn from the tube at a continuous rate by the conveyor. After the start-up batch of sand is cleared, the material descending the conveyor will comprise a mixture of sand and fired ceramic capacitors. The articles are separated from the sand and the sand thereafter reintroduced at the top of the tube together with a new supply of green ceramic articles. After initial start up as described, the process is continuous.

Use of the aforementioned article and method has resulted in substantial energy savings, has enabled the elimination of kiln fixtures such as boats or sleds, has provided improved temperature control due to the small cross-sectional area of the tube, and elimination of convection currents, has reduced floor space necessary for firing apparatus by a factor of 10 or more, has greatly reduced maintenance problems experienced with conventional kilns, has provided superior atmospheric control, has decreased the incidence of damage to the articles during processing and has reduced the processing time to approximately one third of that presently required.

Accordingly, it is an object of the present invention to provide an improved method and apparatus for the burn-out and firing of green ceramic articles, and particularly chip capacitors.

A further object of the invention is the provision of an apparatus of the type described comprising a vertically directed tube of refractory material of any desired cross-sectional configuration, at least one section of which is heated, and conveyor means at the lower end of the tube for extracting, at a predetermined rate, a mixture of sand or like temperature resistant particulate material and fired ceramic articles, the apparatus including means for introducing at the entrance end thereof, at a rate essentially equal to the extraction rate, a mixture of sand and green ceramic articles whereby there is provided, after start-up, an apparatus for the continuous processing of green ceramic articles, such as capacitor chips.

Still a further object of the invention is the provision of a device of the type described wherein the internal atmosphere may be controlled by circulating gases through the mixture of sand and ceramic during processing.

Still a further object of the invention is the provision of an improved method of continuously manufacturing ceramic articles, such as capacitors, having the aforementioned advantages.

To attain these objects and such further object as may appear herein or be hereinafter pointed out, reference is made to the accompanying drawings, forming a part hereof, in which:

FIG. 2 is a magnified section taken on the line 2—2 of FIG. 1.

Figure 1:
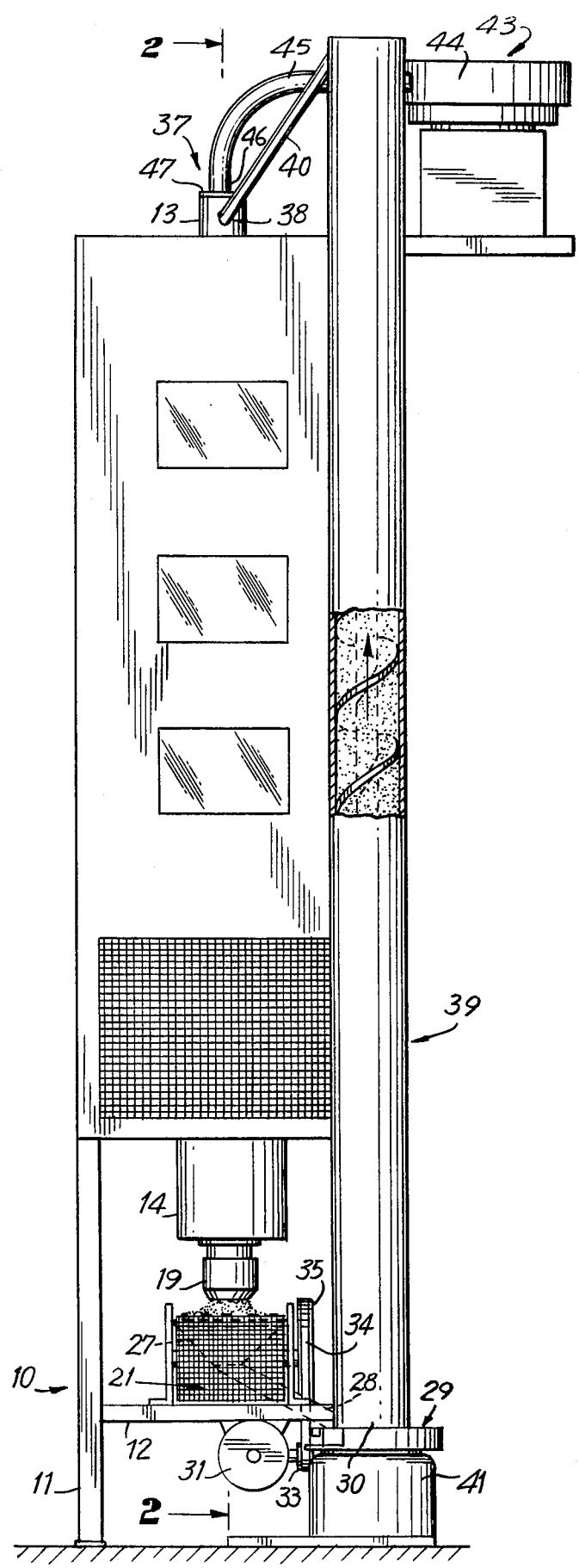
FIG. 1 is a diagrammatic end elevational view of a processing apparatus in accordance with the invention, parts being broken away to show details of internal construction.

Turning now to the drawings, there is shown in a semi-diagrammatic form, processing apparatus for the firing of ceramic articles. The apparatus includes a frame assembly 10 including a plurality of upright stanchions 11 mounting a base frame or bed 12 which supports the processing apparatus.

A vertically oriented furnace tube 13, formed of refractory material such as alumina, ceramic or the like is mounted on a support subassembly 14.

The refractory tube 13 includes a heating zone along its length, such as the zone 15, disposed within an insulating chamber 16. It will be understood that the heating zone may occupy substantially the entirety of the height of the insulation chamber 16 or only a short distance therealong.

The tube 13 includes an entry end 17 at the top and a discharge end 18 at the lower end thereof. The discharge end includes a vertically adjustable tailpiece 19, which is shown in detail in FIG. 2.

The tailpiece 19 is disposed in proximate spaced relation to the upper flight 20 of a conveyor belt member 21. The tailpiece 19 is adjustable toward and away from the upper flight 20 as by threaded connection 19' so as variably to space the lowermost end 22 of the tailpiece from the flight 20.

The conveyor belt 21 is preferably comprised of pivotally interconnecting links extending at least under the entire transverse extent of the tailpiece 19. The belt 21 may be of an open mesh construction, in which case a backing plate 23 is disposed beneath the belt so as to preclude the downward passage of sand through the aperatures in the belt. The conveyor band 21 is looped about drive and idler sprockets 24, 25, respectively.

Downstream of the discharge end 26 of the conveyor 21 there is formed a collector hopper 27 including a depending tube 28 leading to a separator mechanism 29. The separator mechanism 29 includes a sieving screen (not shown) which functions to permit the passage therethrough of the sand into the lowermost or reservoir end 30 of the sand feed conveyor mechanism 39, while enabling the separated fired ceramic articles A to be removed.

The conveyor 21 is driven by a motor 31 operating through gear reduction 32 which, in turn, drives pulley 33 connected by belt 34 to the drive pulley 35 affixed to the shaft 36, on which is mounted drive sprocket 24. The motor and/or gear reduction includes provision, illustratively control C, for varying drive speed so as to control the rate of advance of the conveyor 21.

As will be apparent, the dwell time of materials within the tube 13 is a function of the speed at which the conveyor removes material from the tube 13, and since it is desirable to vary such dwell time in accordance with the requirements of the particular articles being processed, some form of speed regulation of the conveyor is highly desirable.

The refractory tube 13 is provided at its upper or entrance end 17 with an article infeed station 37 for the introduction of green ceramic articles to be processed, and a sand infeed station 38 for the introduction of sand.

The sand conveyor 39 which, illustratively, may be of the auger feed type, extends upwardly from the reservoir 30 and includes a feed chute 40 for advancing sand from the sand feed member into tube 13.

A drive mechanism 41 is disposed beneath the sand conveyor 39. Activation of the drive mechanism 41 is preferably controlled by an optical sensor or photoelectric cell 42 disposed adjacent the uppermost end of the refractory tube 13. It is the function of the sensor 42 to energize the sand feed mechanism 41 to introduce additional sand into the apparatus when an absence of sand is sensed in the area adjacent the sensor.

The articles A to be introduced into the processing apparatus are preferably disposed within vibratory feed mechanism 43 of the type commonly referred to as a "Syntron." The feed mechanism includes a hopper 44 and a discharge tube 45, the lower end 46 of which is mounted to a cap member 47 at the upper end of the tube 13. When the feed mechanism 43 is energized, a function which may also be controlled by the sensor 42, articles stored within the hopper are introduced into tube 13 through the discharge tube 45 at a controlled rate.

It will thus be seen that by appropriate energization of the feeder 43 and sand conveyor 39, a continuous supply of articles and sand is introduced into the upper end 17 of the feed tube 13 in predetermined ratio.

As previously noted, the dwell time of the articles within the tube 13 is a function of the speed of operation of the conveyor 21.

Preferably means are provided for circulating gases through the tube 13 in a selected direction and at various levels. Illustratively, conduits 48 and 49 are provided at upper and lower positions respectively along the tube, which conduits may be selectively connected to a gaseous reagent such as an oxidizing gas, reducing gas, etc.

The operation of the device will be evident from the preceding description.

For purposes of start-up, the sand conveyor 39 is energized without energization of the article feed mechanism 43 until the tube 13 is completely filled with sand. The speed of advance of the conveyor 21 and spacing of the tailpiece 19 from the upper conveyor flight are adjusted in accordance with the size, position, and desired dwell time of the articles in the tube.

The heating mechanism 15 is energized together with the article feed mechanism and the conveyor. The sand employed is necessarily a material which is resistant to melting at the sintering temperatures of the ceramic and may, by way of example, comprise silicon sand or zirconium dioxide sand or combinations thereof.

The furnace tube 13 may be comprised of any suitable refractory material, such as zirconium dioxide.

In accordance with a specific installation, a zirconium dioxide tube 4' tall was employed, the tube having an inside diameter of $2\frac{1}{2}''$. The heated zone or furnace area 15 was approximately 36" high and was heated to an equilibrium temperature of 1120° C. The conveyor 21 was adjusted such as to advance the mixture through the tube 13 at a rate of approximately 12" per hour, whereby a given increment or level of sand and article mix would take approximately 4 hours to traverse the entire length of the tube 13.

Preferably the conveyor 21 may be adjusted to permit a traverse time of from between about 3 to 5 hours.

The device was found ideal for the burn-out and firing of ceramic articles since the burn-out procedures were initiated in the area above the heating zone 15, and the sintering in the area in registry with the zone, the device likewise permitting a "soak time" for the sintered articles in the area beneath the heated zone 15.

The apparatus is run continuously after initial filling, it being understood that the mixture of sand and sintered articles A descending from the discharge end or tailpiece 19 are carried along by upper conveyor flight 20 and deposited into the collector 27, from which, as noted, the mixture is fed to separator 29.

The still hot or warm sand is reintroduced into the sand conveyor 39 and the processed articles A are removed for further manufacturing steps.

Optionally but preferably, the atmosphere within the various levels within the furnace may be controlled as by the introduction of appropriate gases at various levels. Thus, for instance, it is possible to create an oxidizing atmosphere at the level or levels within the tube 13 wherein burn-out is being effected, etc.

The spacing between the tailpiece 19 and upper flight 20 must, of course, be greater than the smallest dimension of the articles A. However, it is desirable that such spacing be as small as possible consonant with the foregoing limitation so as to prevent the sand from freely flowing and spreading laterally.

While the device has been illustrated in conjunction with an auger type conveyor, it will be readily recognized that alternate means may be employed for removing the mixture of sand and processed articles while at the same time eliminating free or uncontrolled downward flow of the mixture through the tube. By way of example, the conveyor may comprise a disk rotatable about a vertical axis, the disk having its upper surface spaced from and disposed immediately below the discharge end of the tube. Only a portion of the disk is disposed in registry with the discharge end of the tube whereby incremental removal of material from the tube is effected at a speed which is a function of the speed of rotation of the disk.

As will be evident to a skilled worker familiarized with the preceding disclosure, various modifications may be made in the illustrated embodiment without departing from the spirit of the invention. For instance, alternate forms of sand deposit conveyors, article infeed conveyors, screen devices and the like may be suitably employed. Accordingly, the invention is to be broadly construed within the scope of the appended claims.

Having thus described the invention and illustrated its use, what is claimed as new and is desired to be secured by Letters Patent is:

1. Apparatus for the firing of ceramic articles, such as capacitors or the like, suspended in a particulate mass of heat resistant material such as sand comprising an elongate, vertically arrayed tubular furnace member of refractory material having an upper entrance end and a horizontally arrayed lower exit end, heating means surrounding said furnace for heating at least a section of said furnace member, horizontally arrayed discharge conveyor means having an upper surface disposed beneath and in proximate spaced blocking (relating onto) relation to said exit end, said conveyor means being spaced from said exit end a distance adapted to be at least slightly greater than the smallest dimension of said articles, said conveyor means comprising a perforate belt member sized to permit said particulate material to pass therethrough but to retain said articles, infeed means at said entrance end for progressively introducing increments of said particulate mass and said articles at a controlled rate, and means for progressively advancing said conveyor means in a horizontal direction across said exit end, at a rate to continuously remove increments of said mass and articles at a rate corresponding substantially to said controlled rate.

2. Apparatus in accordance with claim 1 and including a blocking plate member located beneath said belt member and in registry with said exit end.

3. Apparatus in accordance with claim 1 and including means for inducing gas flow within said furnace.

4. Apparatus in accordance with claim 1 and including sensor means at said entrance end for controlling the rate of introduction of said particulate material by said infeed means.

5. Apparatus in accordance with claim 4 wherein said sensor means comprises a photoelectric cell.

6. A continuous processing apparatus for the firing of green ceramic articles suspended in a carrier mass of particulate material such as sand, comprising an elongate vertically arrayed furnace member of refractory material, said furnace member having an upper entrance end, and a horizontally arrayed lower exit end, heating means in said furnace for heating at least a section thereof, article input conveyor means for depositing ceramic articles to be fired at said entrance end of said furnace, a horizontally arrayed discharge conveyor means comprising a perforate belt member sized to pass said particulate material and to retain said articles disposed in blocking relation to said exit end, the upper surface of said discharge conveyor means being closely spaced from said exit end a distance adapted to be at least slightly greater than the smallest dimension of said articles, drive means for advancing said discharge conveyor means along a horizontal path to extract from said furnace a mixture of particulate material and ceramic articles, means for controlling the speed of said conveyor means and hence the dwell time of said mixture in said furnace, sifter means for receiving said mixture from said discharge conveyor means and separating said articles from said particulate material, and particle conveyor means for returning said separated particulate material from said discharge conveyor to said entrance end of said furnace at substantially the rate it emerges from said exit end.

7. Apparatus in accordance with claim 6 wherein said sifter means is disposed in proximate relation to said exit end and said particle conveyor means is disposed in proximate relation to said sifter means, whereby said particles are returned to said furnace in a still heated condition.

8. Apparatus in accordance with claim 6 and including means for introducing gas flow in said furnace.

* * * * *